United States Patent  (10) Patent No.: US 8,643,282 B2
Huang et al.  (45) Date of Patent: Feb. 4, 2014

(54) DRIVING DEVICE FOR LIGHTING FIXTURE

(71) Applicant: Delta Electronics, Inc., Taoyuan Hsien (TW)

(72) Inventors: Chung-Tsai Huang, Toayuan Hsien (TW); Shang-Jin Yan, Taoyuan Hsien (TW)

(73) Assignee: Delta Electronics, Inc., Taoyuan Hsien (TW)

( * ) Notice: Subject to any disclaimer, the term of this patent is extended or adjusted under 35 U.S.C. 154(b) by 0 days.

(21) Appl. No.: 13/692,687

(22) Filed: Dec. 3, 2012

(65) Prior Publication Data

US 2013/0271007 A1 Oct. 17, 2013

(30) Foreign Application Priority Data

Apr. 17, 2012 (TW) .............................. 101113582 A

(51) Int. Cl.
*H05B 37/02* (2006.01)
(52) U.S. Cl.
CPC ....................................... *H05B 37/02* (2013.01)
USPC ......... 315/121; 315/307; 315/306; 315/185 R
(58) Field of Classification Search
CPC ....................................................... H05B 37/02
USPC .............. 315/121, 185 R, 192, 291, 306, 307
See application file for complete search history.

(56) References Cited

U.S. PATENT DOCUMENTS

| | | | | |
|---|---|---|---|---|
| 8,169,161 | B2 * | 5/2012 | Szczeszynski et al. | 315/308 |
| 8,368,322 | B2 * | 2/2013 | Yu et al. | 315/306 |
| 2011/0133645 | A1 * | 6/2011 | Kuo et al. | 315/77 |
| 2012/0074868 | A1 * | 3/2012 | Tseng et al. | 315/294 |
| 2013/0088169 | A1 * | 4/2013 | Ge et al. | 315/297 |
| 2013/0154482 | A1 * | 6/2013 | Ge et al. | 315/121 |
| 2013/0193851 | A1 * | 8/2013 | Alon et al. | 315/121 |

* cited by examiner

*Primary Examiner* — Don Le
(74) *Attorney, Agent, or Firm* — Evan R. Witt; Kirton McConkie

(57) ABSTRACT

Disclosed is a driving device for driving a plurality of lighting fixtures, including a power converter for converting an input voltage into a DC output voltage; a plurality of lighting fixture bases connected in series with each other and each connected to a corresponding lighting fixture for outputting an operating voltage and an operating current to the lighting fixture. The operating voltage is derived by dividing the DC output voltage, and each operating current is identical with each other. The driving device further includes a plurality of output protection circuits respectively connected in parallel with a lighting fixture base for selectively bypass the lighting fixture base to stop the lighting fixture base from outputting current, and a control circuit connected to the output protection circuits for manipulating the output protection circuit to bypass the lighting fixture bases, thereby regulating the number of the lighting fixtures that illuminate.

11 Claims, 4 Drawing Sheets

US 8,643,282 B2

DRIVING DEVICE FOR LIGHTING FIXTURE

FIELD OF THE INVENTION

The invention is related to a driving device, and more particularly to a driving device for driving a plurality of LED lighting fixtures.

BACKGROUND OF THE INVENTION

In recent years, the issues of environment protection are mushrooming. People are endeavoring to achieve the goal of carbon-saving. Meanwhile, the electronic industry is dedicated to develop green products, such as solar cells or light-emitting diodes. To attain the goal of energy saving, the light-emitting diodes have been universally used in a variety of lighting devices, such as household illuminating devices, car illuminating devices, handheld illuminating devices, and electronic billboards.

Referring to FIG. 1, the configuration of the driving device for driving lighting fixture according to the prior art is shown. In FIG. 1, each lighting fixture 1A-1C is placed at different locations in the house according to user's demands. A driving device 1 is used to simultaneously drive lighting fixtures 1A-1C. The driving device 1 is implemented by a two-stage power converter, which includes a first-stage circuit 11 and a second-stage circuit 12. The first-stage circuit 11 is an AC-DC converter and includes a bus capacitor $C_{bus}$. The first-stage circuit 11 is used to convert the input voltage $V_{in}$, which is in turn filtered and stabilized by the bus capacitor $C_{bus}$ connected to the output end of the first-stage circuit 11. Therefore, a bus voltage $V_{bus}$ with a fixed voltage value is generated. The second-stage circuit 12 is connected to the first-stage circuit 11, and is respectively connected to lighting fixtures 1A-1C through a first lighting fixture base 131A, 131B, a second lighting fixture base 132A, 132B, and a third lighting fixture base 133A, 133B. The second-stage circuit 12 includes several converters (not shown), in which the number of the converters of the second-stage circuit 12 is identical to the number of the lighting fixtures 1A-1C. Thus, the converters of the second-stage circuit 12 can convert the bus voltage $V_{bus}$ into operating voltages $V_{o1}$, $V_{o2}$, $V_{o3}$, respectively. The operating voltages $V_{o1}$, $V_{o2}$, $V_{o3}$ are respectively supplied to the lighting fixtures 1A-1C through the first lighting fixture base 131A, 131B, the second lighting fixture base 132A, 132B, and the third lighting fixture base 133A, 133B.

When the lighting fixture switch 10 is turned on, the input voltage will be supplied to the input end of the first-stage circuit 11 through the lighting fixture switch 10 and converted into a bus voltage $V_{bus}$ with a voltage value of 250V-400V by the first-stage circuit 11. The bus voltage $V_{bus}$ is supplied to the second-stage circuit 12 and is reduced to output a first operating voltage $V_{o1}$, a second operating voltage $V_{o2}$, and a third operating voltage $V_{o3}$ by the second-stage circuit 12, thereby driving the lighting fixtures 1A-1C to illuminate.

As each circuit stage has power loss, the electric energy delivered to the lighting fixture will be reduced as a result of the conversion carried out by the first-stage circuit 11 and the second-stage circuit 12. This would deteriorate the conversion efficiency and waste electric energy. More disadvantageously, the operating efficiency of the driving device 1 can not be enhanced, which would further cause the goal of carbon-saving to be unattainable.

In addition, the driving device 1 is configured to drive LED lighting fixtures of the same specification. As the LED is an element with its luminance being positive proportional to the current, the second-stage circuit 12 has to supply operating currents $I_{o1}$, $I_{o2}$, $I_{o3}$ which have a substantially identical current value with each other to the lighting fixtures 1A-1C, thereby balancing the luminance among the LED lighting fixtures. However, the performances of the converters are inconsistent as the manufacturing of the elements of the converters are different and the elements of the converters have tolerance. Therefore, the current values of the operating currents $I_{o1}$, $I_{o2}$, $I_{o3}$ are not identical with each other.

Furthermore, if the conventional driving device 1 desires to perform dimming operation to the lighting fixtures 1A-1C that are made up of LEDs, each converter of the second-stage circuit 12 requires a dimming circuit and a control unit. As the dimming circuit and the control unit have a complicated circuit structure and a high cost, the manufacturing cost of the conventional driving device 1 for lighting fixture will be boosted and the circuit design of the conventional driving device 1 for lighting fixture will be difficult.

Moreover, the bus capacitor $C_{bus}$ is used to filter and stabilize the bus voltage $V_{bus}$ outputted from the first-stage circuit 11. As the voltage value of the bus voltage $V_{bus}$ is about 250V-400V, the bus capacitor $C_{bus}$ has to be implemented by a capacitor with high rated capacitance and excellent voltage durability. In this manner, the bus capacitor $C_{bus}$ will be bulky and expensive. Also, in order to prevent the driving device 1 or the lighting fixture 1A-1C from being short-circuited as a result of damage, the bus capacitor $C_{bus}$ with a high rated capacitance has to discharge. This would cause a large current surge, which would in turn damage the internal electronic elements of the driving device 1. Also, the driving device 1 requires additional protection circuits to protect the electronic elements. This would further increase the manufacturing cost of the driving device for lighting fixture.

Hence, it is inclined to develop a driving device for light fixture that can address the aforementioned drawbacks and can perform dimming operation to the lighting fixtures. The invention is proposed to meet these requirements.

THE SUMMARY OF THE INVENTION

An object of the invention is to provide a driving device for lighting fixture that can eliminate the bulky and expensive dimming circuit and control unit used in the conventional driving device for lighting fixture and eliminate the bulky bus capacitor with high rated capacitance. Thus, the drawback that the manufacturing cost of the conventional driving device for lighting fixture is too high can be removed. Also, the drawback that the luminance of the lighting fixture driven by the dimming circuit and the control unit is unbalanced can be removed by the invention. Also, the drawback that the driving device for lighting fixture can not be modularized to be applicable to lighting fixtures with different number of LEDs can be removed by the invention. Also, the drawback brought by using a two-stage power converter that the conversion efficiency is low and the overall operating efficiency is low can be removed by the invention.

To this end, a broad aspect of the invention proposes a driving device for driving a plurality of lighting fixtures, including a power converter for converting an input voltage into a DC output voltage; a plurality of lighting fixture bases connected in series with each other and each connected to a corresponding lighting fixture for respectively outputting an operating voltage and an operating current to the corresponding lighting fixture. The operating voltage applied to the positive/negative terminal of the lighting fixture base is derived by dividing the DC output voltage, and each operating current is identical with each other. The inventive driving device further includes a plurality of output protection circuits respectively connected in parallel with a corresponding lighting fixture base for selectively bypassing the corresponding lighting fixture base to stop the lighting fixture base from outputting the operating current to the corresponding lighting fixture. The inventive driving device further includes a control circuit connected to the output protection circuits for outputting a plurality of control signals for actively manipulating the output protection circuits to bypass the lighting fixture base by the control signals, thereby regulating the number of the lighting fixtures that illuminate to achieve the goal of dimming.

Now the foregoing and other features and advantages of the invention will be best understood through the following descriptions with reference to the accompanying drawings, in which:

DESCRIPTION OF THE PREFERRED EMBODIMENT

Several exemplary embodiments embodying the features and advantages of the invention will be expounded in following paragraphs of descriptions. It is to be realized that the present invention is allowed to have various modification in different respects, all of which are without departing from the scope of the present invention, and the description herein and the drawings are to be taken as illustrative in nature, but not to be taken as a confinement for the invention.

Figure 1:
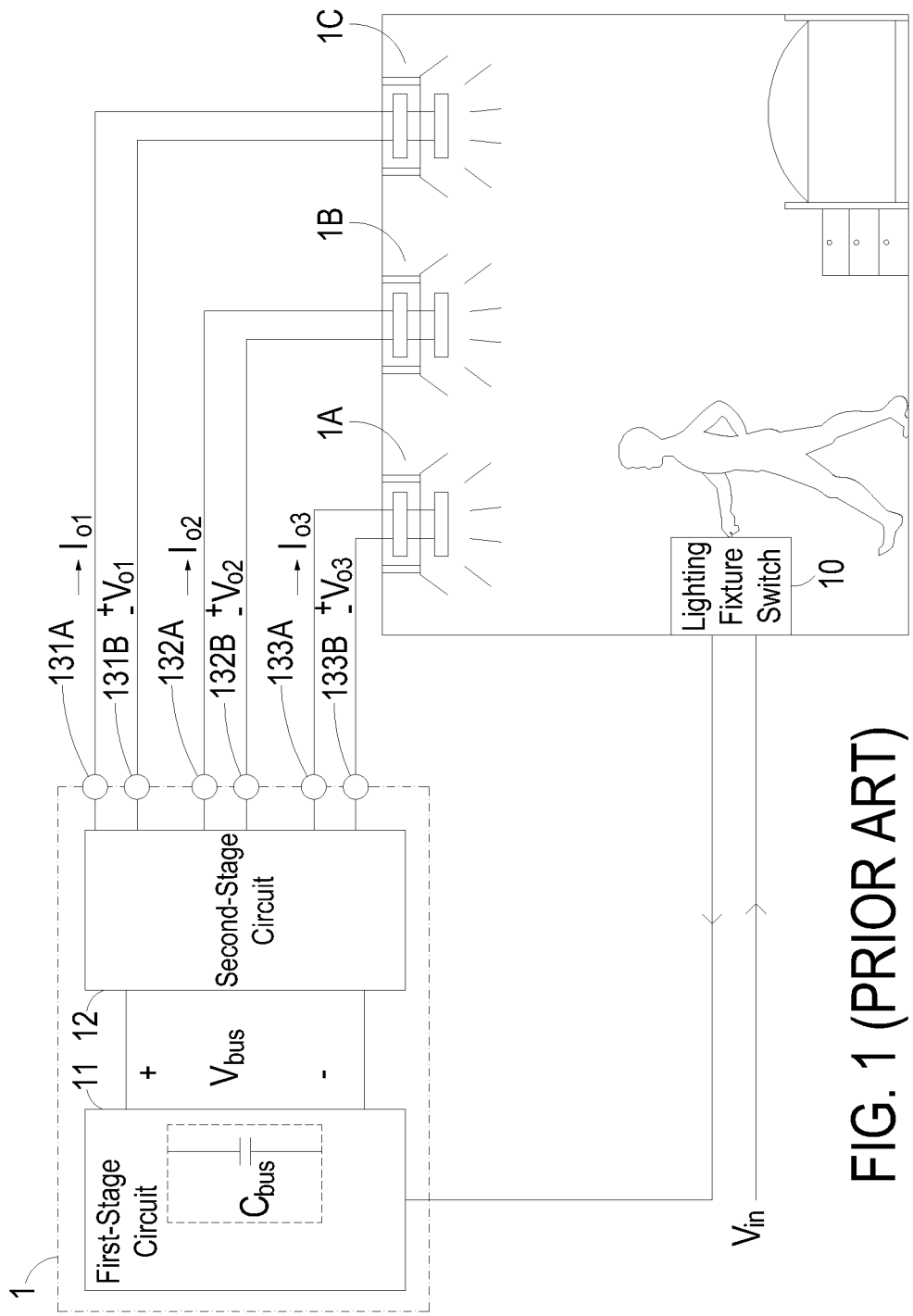
FIG. 1 shows the configuration of a conventional driving device for driving lighting fixture.
Figure 2:
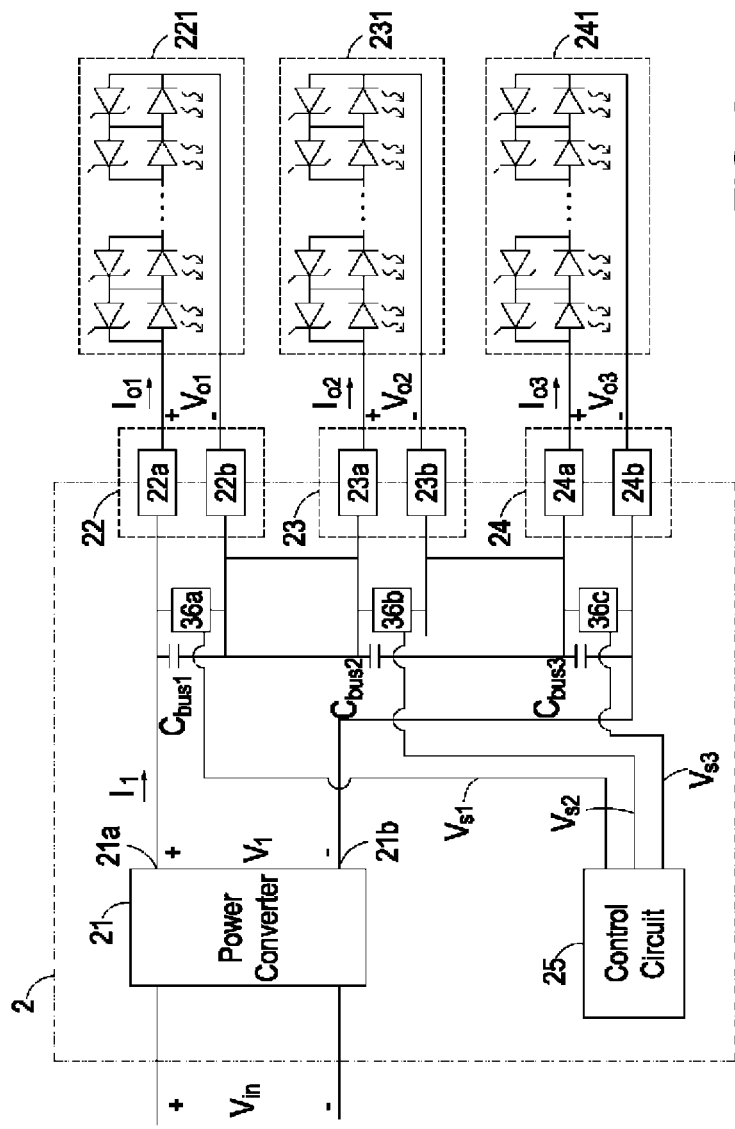
FIG. 2 shows the configuration of a driving device for driving the lighting fixture according to the invention.
Figure 3:
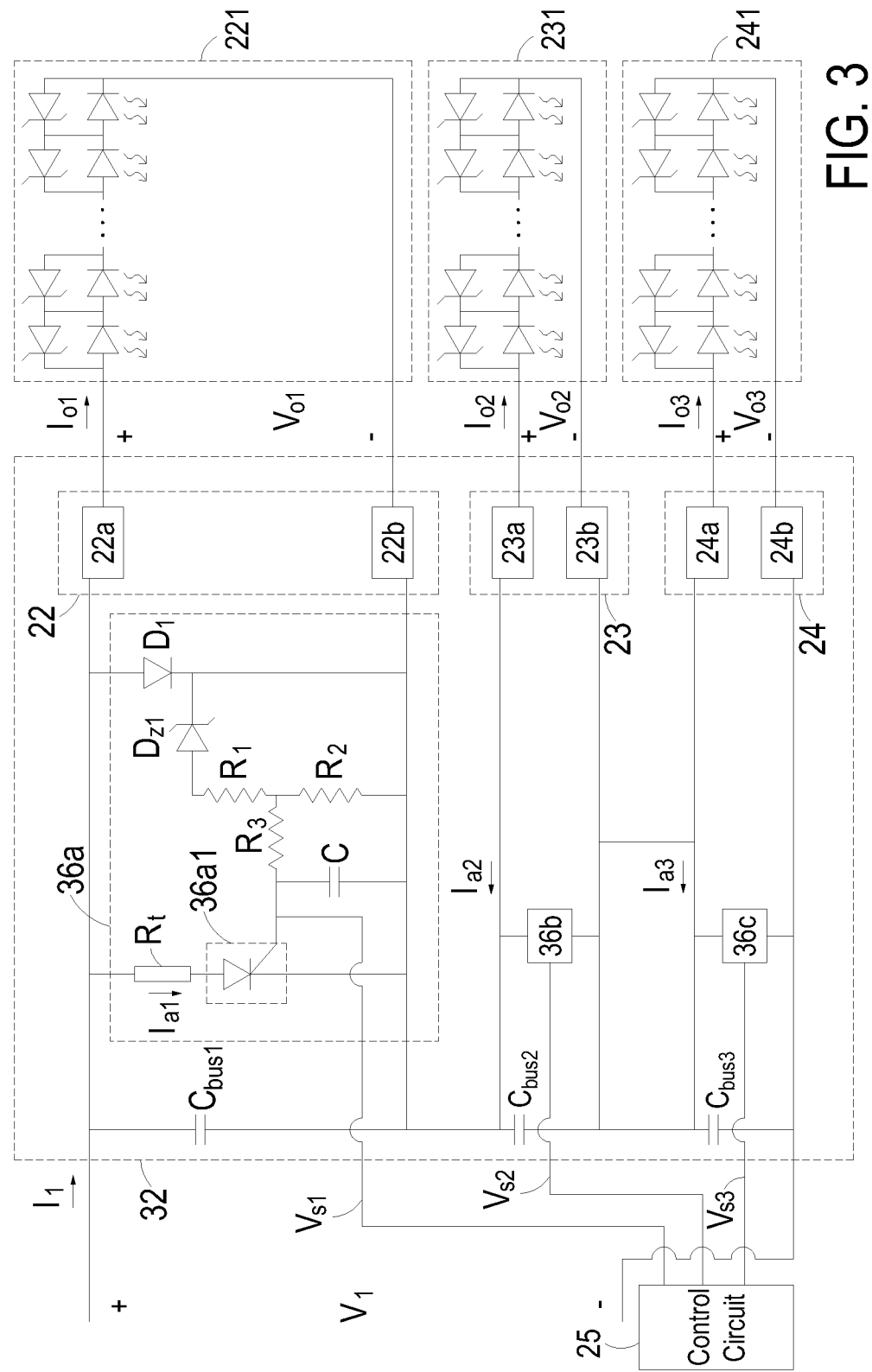
FIG. 3 shows the partial detailed circuitry of the driving device for driving the lighting fixture of FIG. 2.

The inventive driving device is used to drive a plurality of lighting fixtures. The following embodiments will be explained by giving an example of a driving device for driving three lighting fixtures. However, the invention should not be limited to the form precisely disclosed herein. Referring to FIG. 2 and FIG. 3, wherein FIG. 2 shows the configuration of a driving device for driving the lighting fixture according to the invention and FIG. 3 shows the partial detailed circuitry of the driving device for driving the lighting fixture of FIG. 2. As shown in FIG. 2 and FIG. 3, the inventive driving device 2 for driving lighting fixture is used to drive a plurality of lighting fixtures to illuminate. The lighting fixtures include a first lighting fixture 221, a second lighting fixture 231, and a third lighting fixture 241, each of which may be implemented by at least one LED device connected in parallel with each other. The driving device 2 includes a power converter 21, a plurality of lighting fixture bases, a plurality of output protection circuits, a plurality of bus capacitors, and a control circuit 25. The power converter 25 is implemented by a single-stage circuit, such as a single-stage flyback converter, an active-clamp converter, or a resonant converter. The power converter 25 is used to convert an input voltage $V_{in}$ into a DC output voltage $V_1$ and output an output current $I_1$ having a constant current value.

The lighting fixture bases includes a first lighting fixture base 22, a second lighting fixture base 23, and a third lighting fixture base 24 that are connected in series with each other between the positive output terminal 21a and the negative output terminal 21b of the power converter 21. The first lighting fixture base 22, the second lighting fixture base 23, and the third lighting fixture base 24 are used to connect with the first lighting fixture 221, the second lighting fixture 231, and the third lighting fixture 241, respectively. A first operating voltage $V_{o1}$, a second operating voltage $V_{o1}$, and a third operating voltage $V_{o3}$ are respectively supplied to the first lighting fixture 221, the second lighting fixture 231, and the third lighting fixture 241 through the first lighting fixture base 22, the second lighting fixture base 23, and the third lighting fixture base 24, respectively.

In this embodiment, the first lighting fixture base 22 includes a positive terminal 22a and a negative terminal 22b. Likewise, the second lighting fixture base 23 includes a positive terminal 23a and a negative terminal 23b, and the third lighting fixture base 24 includes a positive terminal 24a and a negative terminal 24b. The positive terminal 22a of the first lighting fixture base 22 is connected to the positive output terminal 21a of the power converter 21. The negative terminal of the last lighting fixture base, i.e. the negative terminal 24b of the third lighting fixture base 24, is connected to the negative output terminal 21b of the power converter 21. The negative terminal of the instant lighting fixture base is connected to the positive terminal of the next lighting fixture base. For example, the negative terminal 22b of the first lighting fixture base 22 is connected to the positive terminal 23a of the second lighting fixture base 23, and the negative terminal 23b of the second lighting fixture base 23 is connected to the positive terminal 24a of the third lighting fixture base 24. Also, the first lighting fixture base 22, the second lighting fixture base 23, and the third lighting fixture base 24 are configured to respectively supply a first operating current $I_{o1}$, a second operating current $I_{o2}$, and a third operating current $I_{o3}$ to the first lighting fixture 221, the second lighting fixture 231, and the third lighting fixture 241, respectively.

The bus capacitors includes a first bus capacitor $C_{bus1}$, a second bus capacitor $C_{bus2}$, and a third bus capacitor $C_{bus3}$ that are connected in parallel with the first lighting fixture base 22, the second lighting fixture base 23, and the third lighting fixture base 24, respectively. The first bus capacitor $C_{bus1}$, a second bus capacitor $C_{bus2}$, and a third bus capacitor $C_{bus3}$ are used to respectively filter and stabilize the first operating voltage $V_{o1}$, the second operating voltage $V_{o2}$, and the third operating voltage $V_{o3}$ that are outputted from the first lighting fixture base 22, the second lighting fixture base 23, and the third lighting fixture base 24, respectively.

The output protection circuits includes a first output protection circuit 36a, a second output protection circuit 36b, and a third output protection circuit 36c that are connected in parallel with the first lighting fixture base 22, the second lighting fixture base 23, and the third lighting fixture base 24, respectively. That is, both terminals of the first output protection circuit 36a are connected to the positive terminal 22a and the negative terminal 22b of the first lighting fixture base 22. Both terminals of the second output protection circuit 36b are connected to the positive terminal 23a and the negative terminal 23b of the second lighting fixture base 23. Both terminals of the third output protection circuit 36c are connected to the positive terminal 24a and the negative terminal 24b of the third lighting fixture base 24. The output protection circuits 36a-36c are used to selectively bypass the first lighting fixture base 22, the second lighting fixture base 23, and the third lighting fixture base 24 to stop the first lighting fixture base 22, the second lighting fixture base 23, and the third lighting fixture base 24 from outputting the operating current $I_{o1}$-$I_{o3}$ to the lighting fixtures 221, 231, 241. In other words, the output protection circuits 36a-36c are used to bypass the first lighting fixture base 22, the second lighting fixture base 23, and the third lighting fixture base 24 to allow the driving device to selectively drive a portion of the lighting fixtures 221, 231, 241 to illuminate, instead of allowing the driving device to drive the lighting fixtures 221, 231, 241 to illuminate simultaneously.

The control circuit 25 is connected to the output protection circuits 36a-36c for respectively outputting a plurality of control signals, including a first control signal $V_{s1}$, a second control signal $V_{s2}$, and a third control signal $V_{s3}$, to a corresponding output protection circuit 36a-36c. Thus, the first control signal $V_{s1}$, the second control signal $V_{s2}$, and the third control signal $V_{s3}$ can actively manipulate the output protection circuits 36a-36c to bypass the lighting fixture bases 22-24.

It can be understood from the above descriptions that the output protection circuits 36a-36c can bypass the lighting fixture bases 22-24 under the active control of the control circuit 25. Hence, if the user desires to perform dimming operations to the lighting fixtures 221, 231, 241, the control circuit 25 can actively manipulate the output protection circuits 36a-36c to bypass the lighting fixture bases 22-24. In this manner, the number of the lighting fixtures that illuminate can be controlled to achieve the goal of dimming. For example, the lighting fixture bases 22, 23, 24 are configured to supply the first operating current $I_{o1}$, the second operating current $I_{o2}$, and the third operating current $I_{o3}$ to the first lighting fixture 221, the second lighting fixture 231, and the third lighting fixture 241 to drive the lighting fixtures 221, 231, 241 to illuminate. If the user desires to tune down the overall luminance of the lighting fixtures 221, 231, 241, the user may use a dimming element (not shown) to drive the control circuit 25 to output the first control signal $V_{s1}$ to drive the first output protection circuit 36a to bypass the first lighting fixture base 22. Thus, the first lighting fixture 221 connected to the first lighting fixture base 22 is stopped from illuminating. In this manner, the overall luminance is reduced as the second lighting fixture 231 and the third lighting fixture 241 are the only lighting fixtures that are illuminating. On the other hand, if the user desires to tune up the overall luminance of the lighting fixtures 221, 231, 241, the user may use the dimming element to drive the control circuit 25 to output the first control signal $V_{s1}$ to drive the first output protection circuit 36a to stop bypassing the first lighting fixture base 22. Thus, the first lighting fixture 221 connected to the first lighting fixture base 22 resumes illuminating. In this manner, the overall luminance is enhanced as the first lighting fixture 221, the second lighting fixture 231, and the third lighting fixture 241 are illuminating simultaneously.

As mentioned above, the conventional driving device 1 for lighting fixture uses the bus capacitor $C_{bus}$ to filter and stabilize the bus voltage $V_{bus}$ having a high voltage value. Thus, the manufacturing cost of the conventional driving device 1 is high as the conventional driving device 1 requires a bus capacitor $C_{bus}$ with a large size and high voltage durability. The inventive driving device 2 or lighting fixture uses three bus capacitors $C_{bus1}$-$C_{bus3}$ that are respectively connected in parallel with the lighting fixture bases 22, 23, 24, respectively. Thus, the bus capacitors $C_{bus1}$-$C_{bus3}$ are configured to filter and stabilize the operating voltages $V_{o1}$, $V_{o2}$, $V_{o3}$ having a low voltage value. In this manner, the bus capacitors $C_{bus1}$-$C_{bus3}$ can be implemented by capacitors with a small size and low voltage durability. Thus, the bus capacitors $C_{bus1}$-$C_{bus3}$ are downsized and the manufacturing cost of the driving device is reduced. Besides, even if the lighting fixtures 221, 231, 241 are impaired and short-circuited, the current surge caused by the current discharge of the bus capacitors $C_{bus1}$-$C_{bus3}$ is small as the bus capacitors $C_{bus1}$-$C_{bus3}$ are implemented by capacitors with a small rated capacitance. Therefore, the risk of damaging the internal electronic elements of the driving device 2 is greatly suppressed. Thus, the driving device does not need to employ additional protection circuits to protect the electronic elements, such that the manufacturing cost of the driving device 2 is reduced.

In addition, when the lighting fixture switch (not shown) is turned on to supply the input voltage $V_{in}$ to the input end of the power converter 21, the power converter 21 will convert the input voltage $V_{in}$ into a DC output voltage $V_1$ and output an output current $I_1$ having a substantially constant current value. As the power converter 21 is operating with a constant current mode and the lighting fixture bases 22, 23, 24 are connected in series with each other, the current values of the operating currents $I_{o1}$, $I_{o2}$, $I_{o3}$ are all equal to the output current $I_1$. Even if the lighting fixtures 221, 231, 241 are made up of LEDs that are manufactured by different manufacturers, the operating currents $I_{o1}$, $I_{o2}$, $I_{o3}$ which have identical current values allows the lighting fixtures 221, 231, 241 to have identical luminance.

Moreover, the DC output voltage $V_1$ is equal to the sum of operating voltages $V_{o1}$, $V_{o2}$, $V_{o3}$ and is set to vary along with the operating voltages $V_{o1}$, $V_{o2}$, $V_{o3}$ of the lighting fixtures 221, 231, and 241. As the voltage values of the operating voltages $V_{o1}$, $V_{o2}$, $V_{o3}$ will vary along with the rated operating voltages of the lighting fixtures, the voltage value of the DC output voltage will increase along with the increase of the number of the lighting fixture bases and the increase of the rated operating voltage of the lighting fixture. In order to prevent the user from suffering from electric shock due to the touch with the lighting fixture or the driving device 2, the rated operating voltage of the contemporary lighting fixture is set to be below the minimum voltage value for human body conduction (e.g. 60V) promulgated in safety regulations.

The voltage value of the DC output voltage $V_1$ is set to increase along with the increase of the number of the lighting fixture bases and the increase of the rated operating voltage of the lighting fixture. The operating voltages $V_{o1}$, $V_{o2}$, $V_{o3}$ of the lighting fixture bases 22, 23, 24 that will be touched by the user are the rated operating voltage of the lighting fixtures. The operating voltages $V_{o1}$, $V_{o2}$, $V_{o3}$ are generally below the minimum voltage value for human body conduction (e.g. 60V) promulgated in safety regulations, and will not increase along with the number of the lighting fixture bases. Therefore, even if the user inadvertently touches the lighting fixture or the driving device 2, the user can be safe from being electrically shocked. Furthermore, the inventive driving device 2 is implemented by a single-stage circuit. Hence, the conversion efficiency of the driving device 2 is enhanced and the overall power loss of the driving device 2 is reduced.

Referring to FIG. 2 and FIG. 3, when the lighting fixtures 221, 231, and 241 are abnormal, e.g. when the LEDs are impaired, the output protection circuits 36a-36c which are corresponding to the lighting fixtures 221, 231, 241 can bypass the lighting fixture bases 22, 23, 24 in a passive manner without the need of the active control of the control circuit 25. Thus, the driving device 2 can drive the normal lighting fixtures to prevent the lighting fixtures from being all stopped operating due to the serial connection among the lighting fixture bases 22-24.

Taking the first lighting fixture base 22 as an example, as the LEDs in the first lighting fixture 221 are impaired and thus the first lighting fixture 221 is open-circuited, or as the first lighting fixture 221 is not electrically connected to the first lighting fixture base 22 to cause abnormal conditions, the voltage value of the first operating voltage $V_{o1}$ will increase to exceed the rated operating voltage range of the first operating voltage $V_{o1}$. In this embodiment, when the voltage value of the first operating voltage $V_{o1}$ exceeds 60V, a main switch circuit 36a1 of the first output protection circuit 36a will be activated to turn on, such that the first output protection circuit 36a starts operating to bypass the first lighting fixture base 22, thereby stopping the first lighting fixture base 22 from outputting current. Meanwhile, the current value of the first bypass current $I_{a1}$ flowing into the first output protection circuit 36a is equal to the output current $I_1$ and the current value of the first operating current $I_{o1}$ is zero. Also, the first bypass current $I_{a1}$ flowing into the first output protection circuit 36a will flow through the second lighting fixture base 23 to drive the second lighting fixture 231 and the third lighting fixture 241. In other words, as the lighting fixtures 221, 231, 241 are operating normally, the lighting fixture bases 22-24 will output power to the lighting fixtures, and the output protection circuits 36a-36c will not be activated. Under this condition, the current values of the bypass currents $I_{a1}$-$I_{a3}$ flowing into the output protection circuits 36a-36c are all zero.

Referring to FIG. 2 and FIG. 3, the output protection circuits may all have the same circuit structure. For the simplicity of illustration, the detailed circuitry of the first output protection circuit will be used as an example to explain the circuitry and principle of the output protection circuit. In this embodiment, the first output protection circuit 36a includes a main switch circuit 36a1 and a triggering circuit, in which the main switch circuit 36a1 is connected between the positive terminal 22a and the negative terminal 22b of the first lighting fixture base 22, and the triggering circuit is connected to the positive terminal 22a and the negative terminal 22b of the first lighting fixture base 22 and the control terminal of the main switch circuit 36a1 for manipulating the main switch circuit 36a1 to turn on according to the first operating voltage $V_{o1}$ of the first lighting fixture base 22.

In this embodiment, the main switch circuit 36a1 may be implemented by a silicon-controlled rectifier (SCR). Also, the control terminal of the main switch circuit 36a1 is connected to the control circuit 25. Hence, the control circuit 25 may output the first control signal $V_{s1}$ to the control terminal of the main switch circuit 36a1 to actively manipulate the main switch circuit 36a1 to turn on. The triggering circuit includes a first resistor $R_1$, a second resistor $R_2$, a first zener diode $D_{Z1}$, and a first diode $D_1$. The triggering circuit may optionally include a delay circuit consisted of a third resistor $R_3$ and a first capacitor C that is connected between the triggering circuit and the main switch circuit 36a1. The first diode $D_1$, the first zener diode $D_{Z1}$, the first resistor $R_1$, and the second resistor $R_2$ form a series circuit between the positive terminal 22a and the negative terminal 22b of the first lighting fixture base 22. This series circuit is used for the purpose of current limiting and voltage dividing. When the voltage value of the first operating voltage $V_{o1}$ increases instantaneously and exceeds the rated operating voltage range of the first operating voltage $V_{o1}$, e.g. when the voltage value of the first operating voltage $V_{o1}$ exceeds the rated operating voltage range of the first operating voltage $V_{o1}$ by 10%, the triggering circuit sends a triggering signal to the control terminal of the main switch circuit 36a1 to manipulate the main switch circuit 36a1 to turn on. In this manner, the first output protection circuit 36a starts operating and continues to bypass the first lighting fixture base 22, thereby stopping the lighting fixture base 22 from outputting current. Also, when the user desires to stop the first lighting fixture 221 from illuminating so as to tune down the overall luminance of the lighting fixtures, the control circuit may be driven to output a first control signal $V_{s1}$ to the control terminal of the main switch circuit 36a1 to manipulate the main switch circuit 36a1 to turn on. In this manner, the first output protection circuit 36a starts operating and bypasses the first lighting fixture base 22, thereby stopping the first lighting fixture base from outputting current.

In the foregoing embodiments, when the first lighting fixture 221 is abnormal, the first output protection circuit 36a bypasses the first lighting fixture base 22 passively to stop the first lighting fixture from illuminating. Under this condition, if the abnormal first lighting fixture 221 is renewed, the triggering circuit can not alter its operation to send another triggering signal to the control terminal of the main switch circuit 36a1 to manipulate the main switch circuit 36a1 to turn off. Thus, the output current $I_1$ will still flow into the first output protection circuit 36a and the first bypass current $I_{a1}$ is formed accordingly. Hence, the first lighting fixture base 22 will stay bypassed as a result of the first output protection circuit 36a. Therefore, the renewal of the first lighting fixture 221 will not enable the first lighting fixture 221 to illuminate. Hence, the circuitry of the first output protection circuit 36a is a latch circuit.

In this embodiment, the first capacitor C is connected to the control terminal of the main switch circuit 36a1, and the third resistor $R_3$ is connected between the first resistor $R_1$ and the first capacitor C. The delay circuit which is consisted of the first capacitor C and the third resistor $R_3$ is used to generate a delay time for the timing of manipulating the main switch circuit 36a1 to turn on by the triggering circuit of the first output protection circuit 36a. In this way, the triggering circuit can have a longer time to discern the timing of triggering the main switch circuit 36a1 to turn on, and the risk of causing the faulty operation of the first output protection circuit 36a is reduced.

In alternative embodiments, as shown in FIG. 3, the first output protection circuit 36a may include a thermistor $R_t$ that is connected between the positive terminal 22a of the first lighting fixture base 22 and the main switch circuit 36a1 for limiting the current flowing into the main switch circuit 36a1.

Figure 4:
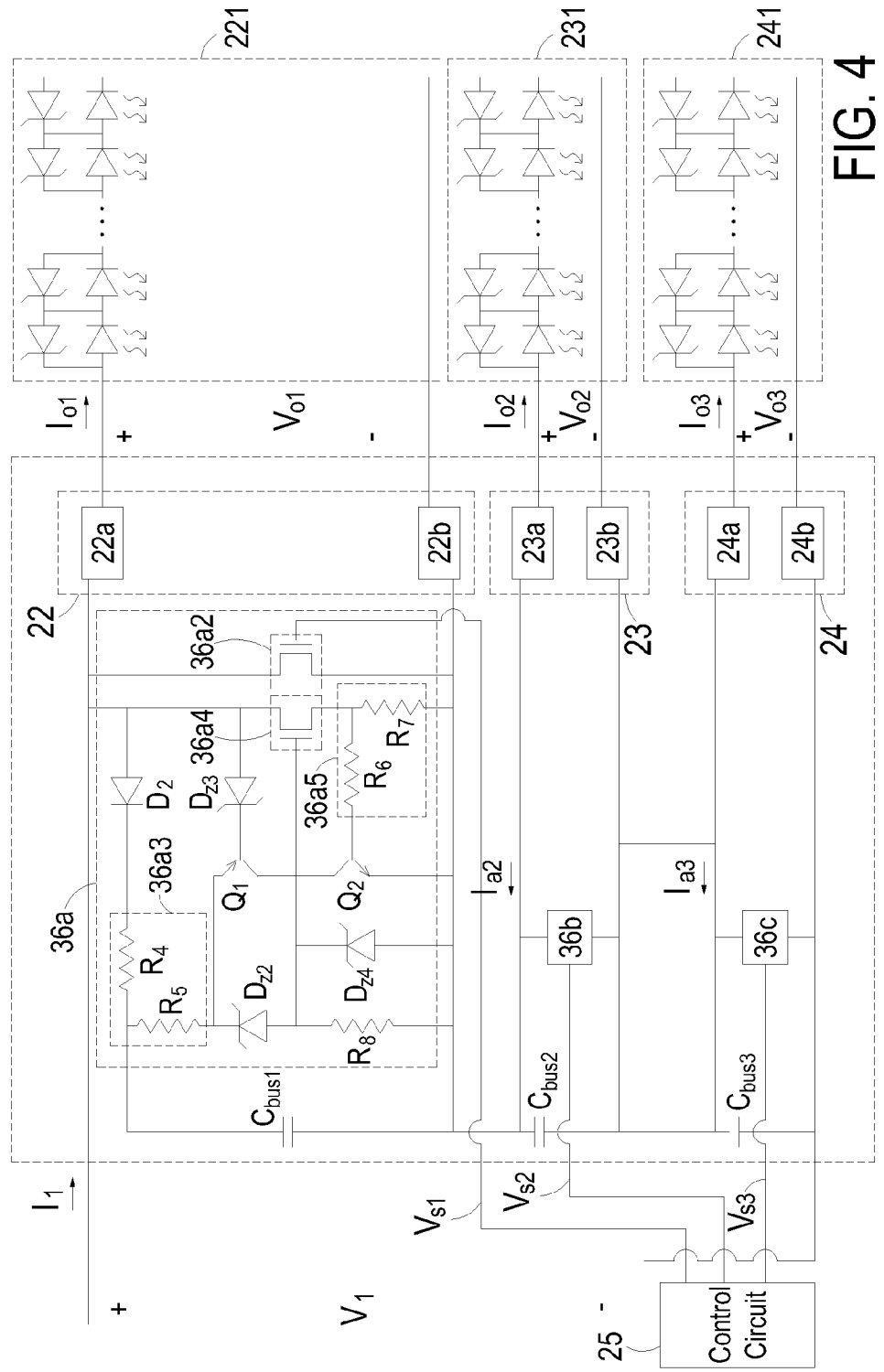
FIG. 4 shows the partial detailed circuitry of the driving device for driving the lighting fixture according to another embodiment of the invention.

Certainly, the circuitries of the output protection circuits 36a-36c are not limited to the form shown in FIG. 3. In alternative embodiments, the circuitry of output protection circuit can be altered to the form shown in FIG. 4. As the circuitries of the output protection circuits 36a-36c are alike, the circuitry of the first output protection circuit 36a is shown in FIG. 4 only for illustration. As shown in FIG. 4, the first output protection circuit 36a includes a main switch circuit 36a2 and a non-latch circuit, in which the main switch circuit 36a2 may be implemented by metal-oxide-semiconductor field effect transistors (MOSFETs). The main switch circuit 36a2 is connected between the positive terminal 22a and the negative terminal 22b of the first lighting fixture 2, and is connected to the control circuit 25. Also, the main switch circuit 36a2 is connected in parallel with the non-latch circuit for being turned on and off according to the active control of the first control signal $V_{s1}$ outputted from the control circuit 25. As the main switch circuit 36a2 is turned on, the first output protection circuit 36a starts operating to bypass the first lighting fixture base 22, thereby stopping the first lighting fixture base 22 from outputting current and achieving the goal of dimming.

The non-latch circuit is connected between the positive terminal 22a and the negative terminal 22b of the first lighting fixture 22, and is connected in parallel with the first bus capacitor $C_{bus1}$ and the main switch circuit 36a2. When the first lighting fixture 221 is abnormal and the voltage value of the first operating voltage $V_{o1}$ increases instantaneously to exceed the rated operating voltage range of the first operating voltage $V_{o1}$, e.g. when the voltage value of the first operating voltage $V_{o1}$ exceeds the rated operating voltage range of the first operating voltage $V_{o1}$ by 10%, the non-latch circuit is driven by the first operating voltage $V_{o1}$ to turn on. Thus, the first output protection circuit 36a is started to operate, such that the first lighting fixture base 22 is bypassed to stop the first lighting fixture base 22 from outputting current. Also, as the abnormal first lighting fixture 221 is renewed, the first output protection circuit 36a is stopping from bypassing the first lighting fixture base 22, thereby allowing the first lighting fixture base 22 to output current again.

The non-latch circuit includes a second diode $D_2$, a current limiter 36a3, a second zener diode $D_{Z2}$, a third zener diode $D_{Z3}$, a first switch circuit 36a4, a PNP bipolar junction transistor $Q_1$, a NPN bipolar junction transistor $Q_2$, and a voltage divider 36a5. The anode of the second diode $D_2$ is connected to the positive terminal 22a of the first lighting fixture base 22, and the cathode of the second diode $D_2$ is connected to the current limiter 36a3. The current limiter 36a3 is connected to the cathode of the second zener diode $D_{Z2}$, the first bus capacitor $C_{bus1}$, and the emitter of the PNP bipolar junction transistor $Q_1$ for limiting the current flowing into the second zener diode $D_{Z2}$ and the PNP bipolar junction transistor $Q_1$. In alternative embodiments, the current limiter 36a3 is consisted of a fourth resistor $R_4$ and a fifth resistor $R_5$. The fourth resistor $R_4$ is connected to the cathode of the second diode $D_2$, the fifth resistor $R_5$, and the first bus capacitor $C_{bus1}$. The fifth resistor $R_5$ is connected to the cathode of the second zener diode $D_{Z2}$, the first bus capacitor $C_{bus1}$, and the emitter of the PNP bipolar junction transistor $Q_1$.

The anode of the second zener diode $D_{Z2}$ is connected to the negative terminal 22b of the first lighting fixture base 22, and the collector of the PNP bipolar junction transistor $Q_1$ is connected to the collector of the NPN bipolar junction transistor $Q_2$. The emitter of the NPN bipolar junction transistor $Q_2$ is connected to the negative terminal 22b of the first lighting fixture base 22. The cathode of the third zener diode $D_{Z3}$ is connected to the base of the PNP bipolar junction transistor $Q_1$, and the anode of the third zener diode $D_{Z3}$ is connected to the positive terminal 22a of the first lighting fixture base 22. The base of the NPN bipolar junction transistor $Q_2$ is connected to the voltage divider 36a5. The first switch circuit 36a4 is connected between the positive terminal of the first lighting fixture base 22 and the voltage divider 36a5. The control terminal of the first switch circuit 36a4 is connected to the anode of the second zener diode $D_{Z2}$. The first switch circuit 36a4 may be implemented by metal-oxide-semiconductor field effect transistors (MOSFETs). The voltage divider 36a5 is used to generate a voltage difference between the base and the emitter of the NPN bipolar junction transistor $Q_2$. The voltage divider 36a5 may be implemented by a sixth resistor $R_6$ and a seventh resistor $R_7$, in which the sixth resistor $R_6$ is connected to the base of the NPN bipolar junction transistor $Q_2$, the first switch circuit 36a4, and the seventh resistor $R_7$. The seventh resistor $R_7$ is connected between the first switch circuit 36a4 and the negative terminal 22b of the first lighting fixture base 22.

When the first lighting fixture 221 is abnormal and an open circuit is created between the positive terminal 22a and the negative terminal 22b of the first lighting fixture base 22 accordingly, the power outputted from the power converter 21 can charge the first bus capacitor $C_{bus1}$ through second diode $D_2$ and the fourth resistor $R_4$ of the current limiter 36a3 by the circuitry of the non-latch circuit. When the voltage value of the first operating voltage $V_{o1}$ is increasing gradually and exceeds the rated operating voltage range of the first operating voltage $V_{o1}$, e.g. when the voltage value of the first operating voltage $V_{o1}$ exceeds the rated operating voltage range of the first operating voltage $V_{o1}$ by 10%, the second zener diode $D_{Z2}$ is driven to turn on to allow the control terminal of the first switch circuit 36a4 to receive an ENABLE voltage through the second zener diode $D_{Z2}$. Thus, the first switch circuit 36a4 is turned on to drive the NPN bipolar junction transistor $Q_2$ to turn on. Meanwhile, the voltage value of the first operating voltage $V_{o1}$ will decrease gradually as the first switch circuit 36a4 is turned on. Under this condition, the third zener diode $D_{Z3}$ and the PNP bipolar junction transistor $Q_1$ will be driven to turn on. As the PNP bipolar junction transistor $Q_1$ and the NPN bipolar junction transistor $Q_2$ are both turned on, the non-latch circuit 36a2 starts operating to drive the first output protection circuit 36a to bypass the first lighting fixture base 22 passively, thereby stopping the first lighting fixture base 22 from outputting current.

Meanwhile, the first bus capacitor $C_{bus1}$ will discharge through the loop consisted of the current limiter 36a3, the PNP bipolar junction transistor $Q_1$, and the NPN bipolar junction transistor $Q_2$, thereby driving the second zener diode $D_{Z2}$ to turn off and driving the first switch circuit 36a4 to turn off. Hence, the first operating voltage $V_{o1}$ will be elevated, and the power outputted from the power converter 21 will charge the first bus capacitor $C_{bus1}$ again through the second diode $D_2$, and the foregoing operations will be repeated.

It can be understood from the above descriptions that when the first lighting fixture 221 is abnormal and the first output protection circuit 36a bypasses the first lighting fixture base 22, the first operating voltage $V_{o1}$ will ascend and descend continuously. When the abnormal first lighting fixture 221 is renewed, the first lighting fixture 221 will illuminate if the voltage value of the first operating voltage $V_{o1}$ increases to be sufficient for driving the new first lighting fixture 221. Thus, the first output protection circuit 36a stop operating, that is, the first output protection circuit 36a can not bypass the first lighting fixture base. Hence, the circuitry of the first output protection circuit 36a shown in FIG. 4 is a non-latch circuit.

In alternative embodiments, as shown in FIG. 4, the non-latch circuit may further include an eighth resistor $R_8$ and a fourth zener diode $D_{Z4}$, in which the eighth resistor $R_8$ is connected to the anode of the second zener diode $D_{Z2}$, the control terminal of the first switch circuit 36a4, and the negative terminal 22b of the first lighting fixture base 22 for regulating the voltage on the control terminal of the first switch circuit 36a4. The fourth zener diode $D_{Z4}$ is connected to the control terminal of the first switch circuit 36a4 and the negative terminal 22b of the first lighting fixture base 22 for protecting the first switch circuit 36a4.

Referring to FIGS. 3 and 4, as the lighting fixture bases 22-24 and the output protection circuits 36a-36c do not have complicated control circuitry, the lighting fixture bases 22-24 and the output protection circuits 36a-36c can be modularized as an output module 32 which has different number of lighting fixture bases. When the user desires to drive more lighting fixtures, it is only required to replace the output module 32. For example, the output module for driving three lighting fixtures can be replaced with an output module for driving six lighting fixtures.

In conclusion, the driving device for driving LED lighting fixtures according to the invention can manipulate a plurality of output protection circuits by a control circuit and perform dimming operation to the lighting fixtures. More advantageously, the bus capacitors of the driving device are respectively connected in parallel with the lighting fixtures, such that the bus capacitors can be implemented by capacitors with low rated capacitance, small size, and low voltage durability. Thus, the manufacturing cost of the driving device is reduced.

Also, the inventive driving device is implemented by a single-stage circuit, such that the conversion efficiency of the driving device is enhanced, and the current and luminance of the lighting fixtures are balanced with each other. Furthermore, the inventive driving device can be modularized to accomplish a driving device for driving different number of lighting fixtures with low cost. Thus, the manufacturer of the driving device for lighting fixtures can produce a driving device for different number of lighting fixtures.

While the invention has been described in terms of what are presently considered to be the most practical and preferred embodiments, it is to be understood that the invention need not be restricted to the disclosed embodiment. On the contrary, it is intended to cover various modifications and similar arrangements included within the spirit and scope of the appended claims which are to be accorded with the broadest interpretation so as to encompass all such modifications and similar structures. Therefore, the above description and illustration should not be taken as limiting the scope of the invention which is defined by the appended claims.

What is claimed is:

1. A driving device for lighting fixture, comprising:
    a power converter for converting an input voltage into a DC output voltage;
    a plurality of lighting fixture bases connected in parallel with each other and each connected to a lighting fixture for respectively outputting an operating voltage and an operating current to a lighting fixture, wherein the operating voltage between a positive terminal and a negative terminal of the lighting fixture base is derived by dividing the DC output voltage and each operating current is identical with each other;
    a plurality of output protection circuits respectively connected in parallel with a lighting fixture base for selectively bypass the lighting fixture base to stop the lighting fixture base from outputting the operating current to the lighting fixture; and
    a control circuit connected to the plurality of output protection circuits for outputting a plurality of control signals for actively manipulating the output protection circuits to bypass the lighting fixture base according to the control signals, thereby manipulating the number of the lighting fixtures that illuminate and achieving a dimming performance.

2. The driving device for lighting fixture according to claim 1 further comprising a plurality of bus capacitors, each of which is connected in parallel with a lighting fixture base for filtering and stabilizing the operating voltage outputted from the lighting fixture base.

3. The driving device for lighting fixture according to claim 2 wherein each output protection circuit includes a main switch circuit connected between the positive terminal and the negative terminal of the lighting fixture base of the lighting fixture base and having a control terminal connected to the control circuit for being turned on or off according to the control signal, thereby manipulating the output protection circuit to bypass the lighting fixture base to achieve the dimming performance.

4. The driving device for lighting fixture according to claim 3 wherein when one of the lighting fixtures is impaired to drive the lighting fixture to be open-circuited or when the lighting fixture is not connected to the lighting fixture base to allow a voltage value of the operating voltage of the lighting fixture base to exceed a rated operating voltage range, the output protection circuit is started operating to bypass the lighting fixture base to stop the lighting fixture base from outputting current.

5. The driving device for lighting fixture according to claim 4 wherein each output protection circuit includes:
    a triggering circuit connected to the positive terminal and the negative terminal of the lighting fixture base and the control terminal of the main switch circuit for manipulating the main switch circuit to turn on according to the operating voltage of the lighting fixture base;
    wherein when the operating voltage of the lighting fixture base exceeds the rated operating voltage range, the triggering circuit sends a triggering signal to the control terminal of the main switch circuit to manipulate the main switch circuit to turn on, thereby allowing the output protection circuit to operate to continue bypassing the lighting fixture base to stop the lighting fixture base from outputting current.

6. The driving device for lighting fixture according to claim 5 wherein the triggering circuit includes a first resistor, a second resistor, a first diode, and a first zener diode that form a series circuit between the positive terminal and the negative terminal of the lighting fixture base for the purpose of current limiting and voltage dividing.

7. The driving device for lighting fixture according to claim 4 wherein each output protection circuit includes:
    a non-latch circuit connected between the positive terminal and the negative terminal of the lighting fixture base and connected in parallel with a bus capacitor and the main switch circuit for allowing the output protection circuit to start operating to bypass the lighting fixture base and stop the lighting fixture from outputting current when the lighting fixture is abnormal, and stopping the output protection circuit to bypass the lighting fixture base and allowing the lighting fixture base to output current when the lighting fixture that is abnormal is renewed.

8. The driving device for lighting fixture according to claim 7 wherein the non-latch circuit includes:
    a second diode having an anode connected to the positive terminal of the lighting fixture base and a cathode;
    a current limiter connected to the cathode of the second diode and a bus capacitor;
    a second zener diode having a cathode connected to the current limiter and an anode connected to the negative terminal of the lighting fixture base;
    a PNP bipolar junction transistor having a base, a collector, and an emitter connected to the current limiter and the cathode of the second zener diode;
    a NPN bipolar junction transistor having a base, a collector connected to the collector of the PNP bipolar junction transistor, and an emitter connected to the negative terminal of the lighting fixture base;
    a third zener diode having a cathode connected to the base of the PNP bipolar junction transistor and an anode connected to the positive terminal of the lighting fixture base;
    a voltage divider connected to the base and emitter of the NPN bipolar junction transistor for generating a voltage difference between the base and the emitter of the NPN bipolar junction transistor; and
    a first switch circuit connected to the positive terminal of the lighting fixture base and the voltage divider and having a control terminal connected to the anode of the second zener diode;
    wherein the second zener diode, the PNP bipolar junction transistor, and the NPN bipolar junction transistor are set to turn on when the operating voltage of the lighting fixture base exceeds the rated operating voltage range, thereby allowing the output protection circuit to start operating to bypass the lighting fixture base to stop the lighting fixture base from outputting current.

9. The driving device for lighting fixture according to claim 8 wherein the current limiter includes:
- a fourth resistor connected to the cathode of the second diode, the fifth resistor, and a bus capacitor; and
- a fifth resistor connected to the cathode of the second zener diode, a bus capacitor, and the emitter of the PNP bipolar junction transistor;
- wherein the current limiter is configured to limit a current flowing into the second zener diode and the PNP bipolar junction transistor.

10. The driving device for lighting fixture according to claim 8 wherein the voltage divider includes:
- a sixth resistor connected to the base of the NPN bipolar junction transistor, the first switch circuit, and the seventh resistor; and
- a seventh resistor connected between the first switch circuit and the negative terminal of the lighting fixture base.

11. The driving device for lighting fixture according to claim 8 wherein the non-latch circuit further includes:
- an eighth resistor connected to the anode of the second zener diode, the control terminal of the first switch circuit, and the negative terminal of the lighting fixture base for regulating a voltage on the control terminal of the first switch circuit; and
- a fourth zener diode connected between the control terminal of the first switch circuit and the negative terminal of the lighting fixture base for protecting the first switch circuit.

* * * * *